United States Patent [19]

Ogawa

[11] Patent Number: 4,739,683
[45] Date of Patent: Apr. 26, 1988

[54] APPARATUS FOR CUTTING MATERIAL SHEET INTO TRAPEZOIDAL PIECES

[75] Inventor: Hiromi Ogawa, Hamamatsu, Japan

[73] Assignee: Sumikura Industrial Company Limited, Tokyo, Japan

[21] Appl. No.: 1,429

[22] Filed: Jan. 8, 1987

[30] Foreign Application Priority Data

Mar. 19, 1986 [JP] Japan .................................. 61-61729

[51] Int. Cl.[4] .......................... B23D 25/04; B26D 1/60
[52] U.S. Cl. ........................................ 83/320; 83/316; 83/559; 83/581
[58] Field of Search ................. 83/320, 316, 278, 215, 83/581, 559

[56] References Cited

U.S. PATENT DOCUMENTS 3,811,354  5/1974  Ito ......................................... 83/320
4,103,576  8/1978  Benz ...................................... 83/320
4,196,645  4/1980  Shimizu et al. ..................... 83/320 X Primary Examiner—Donald R. Schran
Attorney, Agent, or Firm—Oblon, Fisher, Spivak, McClelland & Maier

[57] ABSTRACT

A turning arm has an inverted U-shape and is supported for rotational movement by two pairs of horizontally disposed crank shafts. A lower cutter holder supporting base is mounted for movement only in the direction feeding of material to be cut. A turning table is rotatably mounted on an upper surface of the base for rotation about a substantially vertical axis, and an upper cutter holder having an upper cutter is rotatably mounted on the turning arm above the lower cutter holder for rotation about the substantially vertical axis. The upper cutter and lower cutter are constrained to move together in the horizontal feed direction, while the upper cutter is permitted to reciprocate vertically relative to the lower cutter.

10 Claims, 3 Drawing Sheets

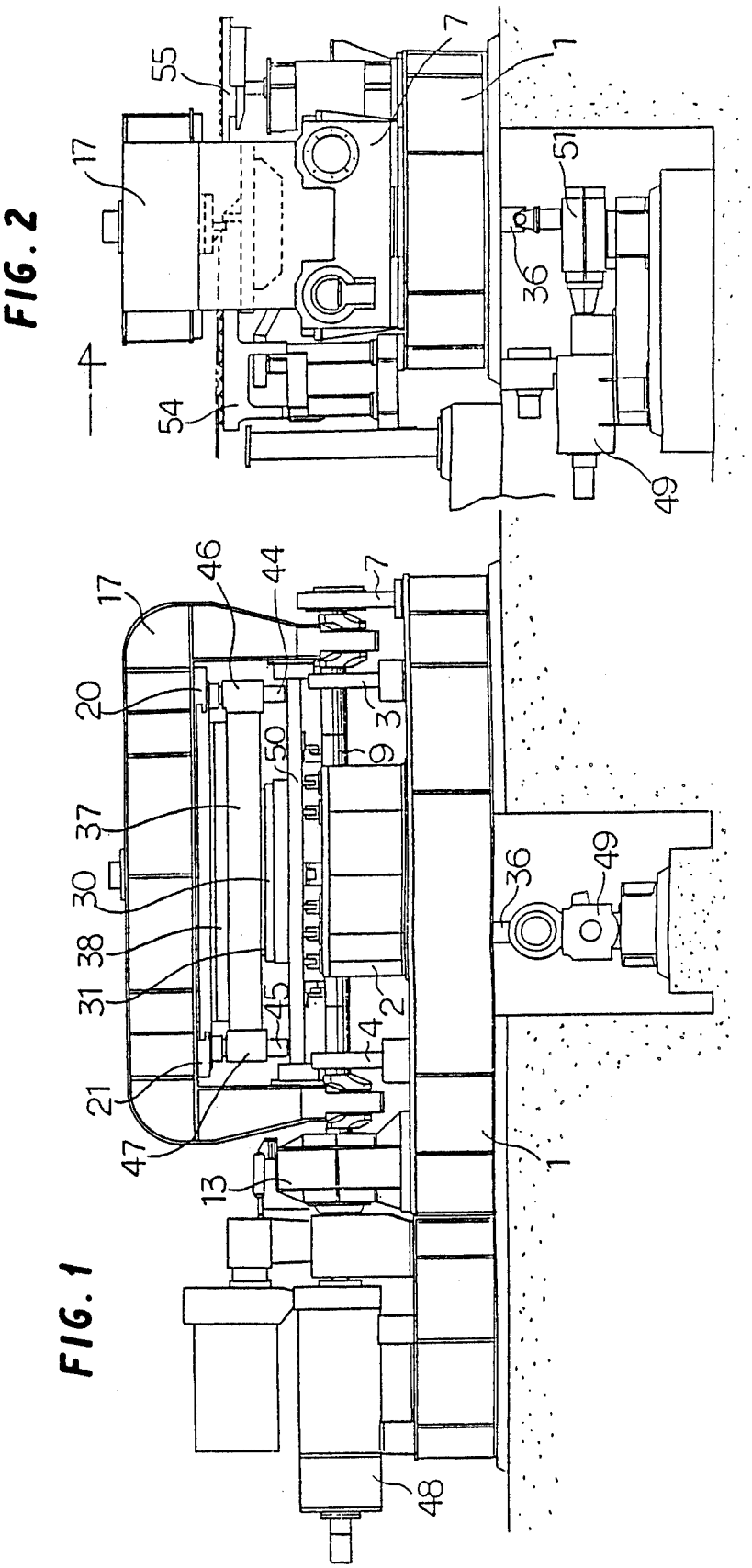

APPARATUS FOR CUTTING MATERIAL SHEET INTO TRAPEZOIDAL PIECES

BACKGROUND OF THE INVENTION

1. Field of the Invention

This invention relates to an apparatus for cutting a coiled material sheet into trapezoidal pieces while continuously feeding the coiled material sheet at a fixed speed.

2. Brief Description of the Related Art

Trapezoidal sheet material cutting apparatuses are known in which vertically reciprocating blades cut through the entirety of the width of the material. Since the formation of trapezoid shaped pieces requires that the cut angles be different at opposite sides of each cut piece, it is necessary to adjust the angles of the blades between each cut. In the conventional trapezoid cutting apparatus, only the upper cutter is movable whereas the lower one is stationary. Moreover, the entire unit of cutter holders turns by an angle required for forming a trapezoid. This results in low cutting efficiency due to stoppage of the feeding of the material sheet following each cut in order to permit the angular adjustment of the cutter holders.

SUMMARY OF THE INVENTION

An object of this invention is to provide an apparatus, which is small in size, light in weight, and trouble-free, for cutting with increased efficiency a continuously fed material sheet into trapezoidal pieces having corner angles of desired values.

The apparatus of the present invention includes a turning arm having an inverted U-shape and at least two parallel lines of horizontally disposed crank shafts, the turning arm being supported by cranks of the crank shaft, whereby the turning arm moves with a circular motion having a radius equal to that of the cranks. The apparatus of the invention further includes means for rotating the crank shafts, means for moving the material to be cut through the turning arm in a substantially horizontal feeding direction, a lower cutter holder supporting base disposed below a central portion of the turning arm, means for permitting the base to move only in the feeding direction, means for moving the base in the feeding direction in synchronization with the turning arm, a turning table mounted on an upper surface of the base for rotation about a substantially vertical axis, means for rotating the turning table, a lower cutter holder having a lower cutter and mounted on the turning table, an upper cutter holder having an upper cutter and rotatably mounted on the turning table above the lower cutter holder for rotation about the substantially vertical axis, and means for causing the upper cutter holder to rotate with the lower cutter holder while permitting the upper cutter holder to vertically reciprocate relative to the lower cutter holder. As a result of the above structure, the upper and lower cutter holders can be moved together to a desired angular orientation and relatively vertically reciprocated, while continuously moving together, and together with material being fed, in the feeding direction during a cutting operation.

The above structure results in improved cutting efficiency since it is no longer necessary to stop the feeding of the material sheet every time the cutting operation is performed. Instead, angular adjustment of the cutter holders can be performed simultaneously with the reciprocation of the cutter holders.

The provision of two lines of crank shafts which are horizontally disposed makes the entire body of the apparatus small in size and light in weight.

The material is cut while the speed of the sheet material being fed and the cutters are equal to each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a front view of an apparatus of the invention;

FIG. 2 is a side view thereof;

DETAILED DESCRIPTION OF THE PREFERRED EMBODIMENTS

Figure 3:
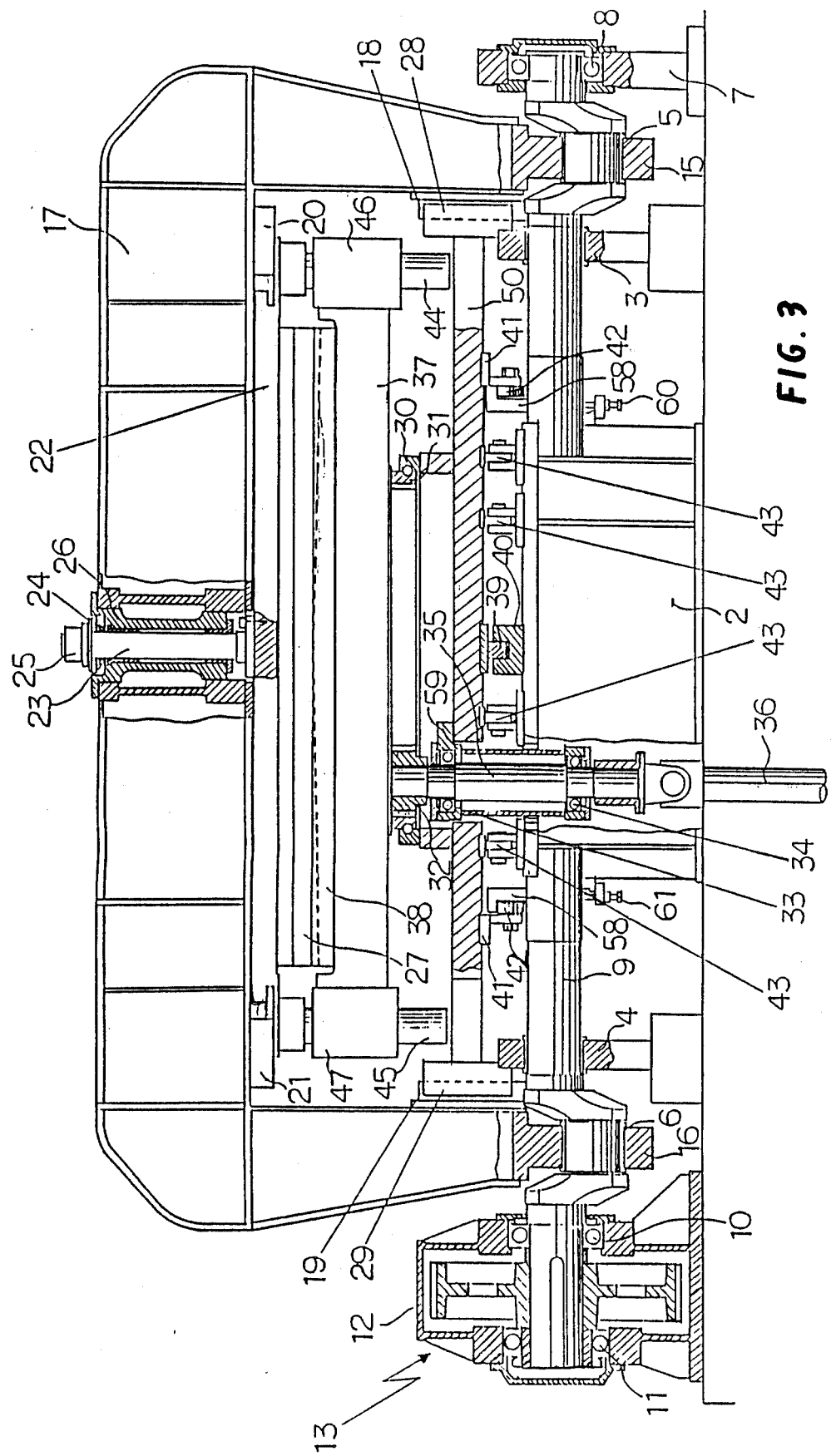
FIG. 3 is a front view of a section of the main part of the cutting apparatus.

An apparatus according to an embodiment of this invention is provided with a crank shaft 9 bearingly supported by three types of members. A first type of support member is a bearing stud 7 having a bearing 8 internally fitted thereinto. A second type is a unit 13 serving as both a reduction gear and a gear box into which bearings 10 and 11 are fitted. A third type is exemplifed by the bearing supporting stands 3 and 4 including bearing metal assemblies.

Another crank shaft 53 is provided with a gear 57 to mesh with a gear 56 which is non-rotatably fitted onto an output shaft 52 to receive driving power from a driving source 48. The gear 56 also meshes with a gear 12 disposed in the gear box 13. The gear 57 is mounted in the same manner as the gear 12, and the crank shaft 53 is shaped in the same configuration as that of the crank shaft 9, and is supported by bearings in the same way as is crank shaft 9.

A turning arm 17 is in the shape of an inverted U and is supported by four bearings including the bearings 15 and 16 of the crank parts 5 and 6 of the crank shaft 9 and the corresponding bearings of the cranks of the crank shaft 53.

On the other hand, a bed 2 is provided on the central lower part of the apparatus. A plurality of rollers 43 are rotatably supported by bearings fixed to the bed 2 and a base 50 for supporting a lower cutter holder is supported for horizontal movement on the rollers 43. For enabling the base 50 to be displaced along the feeding direction of the material sheet while being restricting from rightward and leftward movement, the bed 2 is provided with a U-shaped guide member 40 and the base 50 is provided with a guide composed of a member 39 slidably fitted into the aforesaid guide member 40. Further, for preventing floating of the base 50, rollers 42 are supported by brackets 41 provided on the base 50, and hook-like guide members 58, which are vertically adjustable by means of bolts 60 for appropriate contact with the rollers 42, are provided on the bed 2.

For forward and backward movement of the base 50 together with the turning arm 17 along the feeding direction of the material sheet, while permitting vertical movement of only the turning arm 17, U-shaped guide members 28 and 29 are fixed to the base 50 at both ends thereof and respectively slidably fitted onto the slide guides 18 and 19 provided on the turning arm 17.

A rotatable slide ring 30 is fixed to the base 50 and a turning table 31 having an internally toothed gear is provided therewithin. The lower cutter holder 37 is fixed to the table 31. For rotating the turning table, a meshing gear 32, which is fitted onto one end of a shaft 35 fitted to the base 50 via a bracket 59 and rotatably supported by the bracket 59, is adapted to mesh with the internal gear of the turning table 3. The shaft 35 is connected to a table-turning motor 49, which is provided below the apparatus, by a universal joint 36 through a reduction gear 51.

The lower cutter holder 37 fixed to the turning table 31 is provided with boss parts 46 and 47 at both ends thereof. Above these boss parts 46 and 47 is provided an upper cutter holder 22, which is suspended by a shaft 23 rotatably fixed to the top of the turning arm 17 while being retained by a thrust bearing 24 on the shaft 23 and a nut 25 pressing the thrust bearing 24. The upper cutter holder 22 is horizontally slidable with respect to the turning arm 17 about the axis of shaft 23 and is so guided by slide guides 20 and 21 for guiding and supporting both ends of the upper cutter holder 22 and so restricted from vertical movement. The upper cutter holder 22 is also provided with guide posts 44 and 45 fixed to both ends thereof. The guide posts 44 and 45 are vertically slidably fitted onto the boss parts 46 and 47. Guides 54 and 55 for the material sheet are respectively provided on the feed side and the delivery side of the turning arm.

In operation of the apparatus, the crank shafts 9 and 53 are rotated together by the driving motor 48. As a result, the turning arm 17 is brought into circular motion with a radius corresponding to the crank radius. Due to the circular motion of the turning arm 17, the lower cutter holder supporting base 50, which is restricted from vertical movement by rollers 43, repeats horizontal back-and-forth movement due t the horizontal back-and-forth component of the circular motion of the turning arm 17, as transferred by the slide guides 18 and 19, and the U-shaped members 28 and 29. Therefore, the lower cutter holder 37 which is mounted on the base 50 also repeats back-and-forth movement.

Since the upper cutter holder 22 is supported on the turning arm 17, it experiences circular motion of the same radius and frequency as the circular motion of the turning arm 17. However, since the upper cutter holder 22 and the lower cutter holder 37 are prevented from relative horizontal movement by guide posts 44 and 45 and bosses 46 and 47, the distance between the cutters 27 and 28 fixed to the cutter holders is repeatedly varied only in the direction of clearance, that is, in the vertical direction, during each turn of the turning arm 17, but the cutters 27 and 28 move together in the horizontal direction.

Moreover, when the driving source 49 for turning the base 50 is rotated, the rotation thereof is transmitted to the gear 32 provided on the shaft 35 via the universal joint 36 and, due to the rotation of the gear 32, to the internal gear of the turning table 31, thereby causing the turning table 31 and the lower cutter holder 37 fixed thereto to turn. With the turning of the lower cutter holder, the upper cutter holder 22, restricted from horizontal movement relative thereto by bosses 46 and 47 and guide posts 44 and 45, is turned together with the lower cutter holder 37 around the shaft 23 while being supported at both ends and guided by slide guides 20 and 21.

Figure 4:
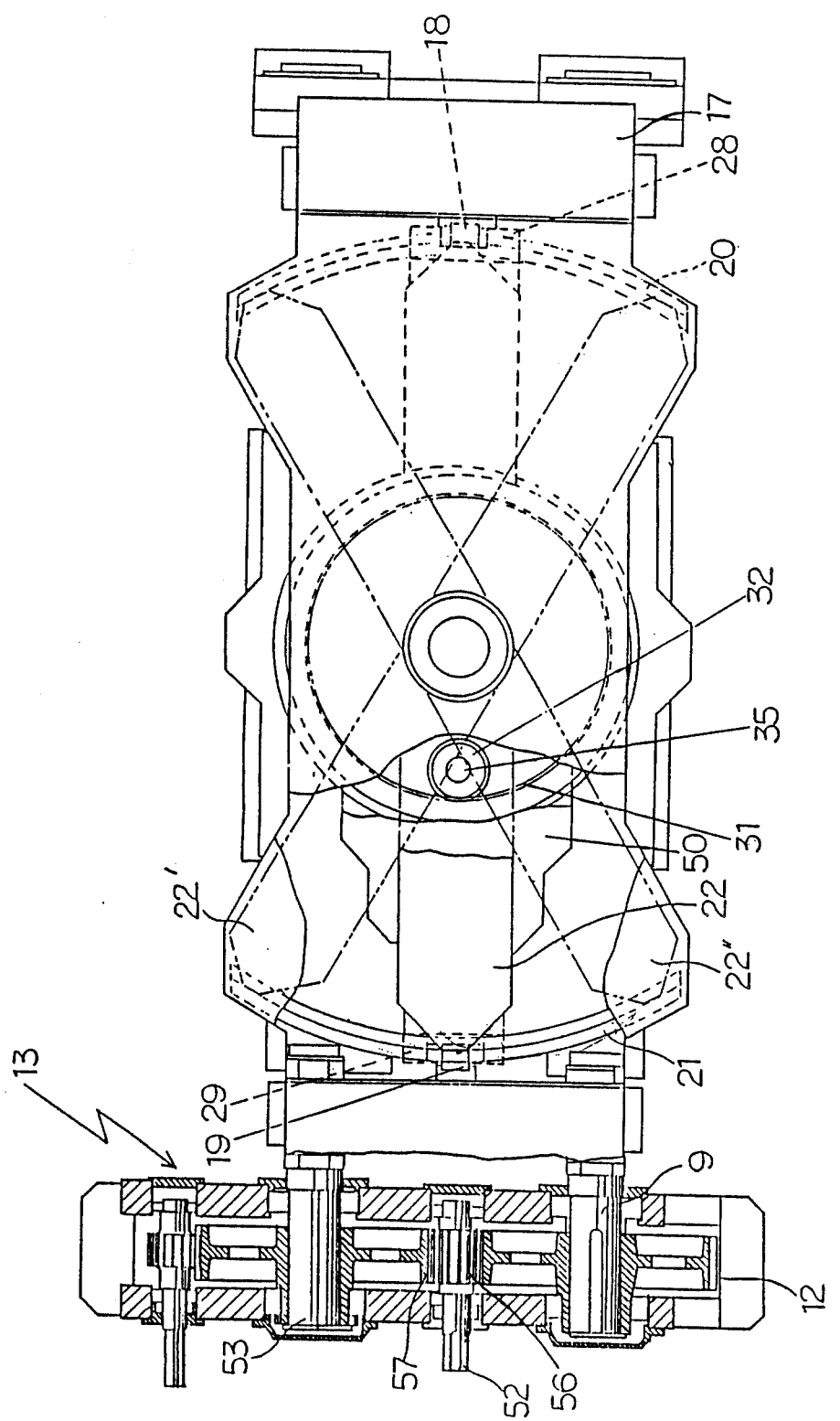
FIG. 4 is a plan view of a section of the main part thereof.

The process of cutting the material sheet proceeds in a sequence beginning where the material sheet is fed from a guide table 54 located on the feed side, as shown in FIG. 2. Feeding speed of the material is controlled so that the speed of the turning table in the horizontal direction agrees with that of feeding the material sheet at the moment when the material sheet is cut by lapping of the upper and the lower cutters 27 and 38. The driving motor 49 for turning the table is stopped after being driven in such manner that the cutter holders are disposed at a desired angle with respect to the moving direction of the material sheet for cutting the material sheet into trapezoidal pieces. An operation to set such an angle is so controlled as to be completed earlier than the start of the actual cutting of the sheet. To cut the material sheet into trapezoidal pieces, the upper cutter holder 22 (and, although not shown, the lower cutter holder 37) are first set in a position shown as 22′ and, after the sheet is cut and conveyed forward, reset in a position 22″ for further cutting (FIG. 4).

Repeat of such a sequence of operations enables cutting of the material sheet into trapezoidal pieces.

This invention enables the cutting of a material sheet into trapezoidal pieces with high efficiency by providing a turning part which is simple and light in weight so as to cut the time for turning and to raise the cutting capacity of the cutting apparatus.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for cutting a material sheet, comprising:
   a turning arm having an inverted U-shape;
   at least two lines of horizontally disposed crank shafts, said turning arm being supported by cranks of said crank shafts, whereby said turning arm moves with a circular motion having a radius equal to that of said cranks;
   means for rotating said crank shafts;
   means for moving material to be cut through a central portion of said turning arm in a substantially horizontal feeding direction;
   a lower supporting base disposed below said central portion of said turning arm;
   means for permitting said base to move only in said feeding direction;
   means for moving said base in said feeding direction in synchronization with movement of said turning arm in said feeding direction;
   a turning table mounted on an upper surface of said base for rotation about a substantially vertical axis;
   means for rotating said turning table;
   a lower cutter holder having a lower cutter and being mounted on said turning table;
   an upper cutter holder having an upper cutter and being rotatably mounted on said turning arm above said lower cutter holder for rotation about said substantially vertical axis; and
   means for causing said upper cutting holder to rotate together with said lower cutter holder while permitting said upper cutter holder to vertically reciprocate relative to said lower cutter holder, whereby said upper and lower cutter holders can be rotated together to a desired angular orientation and can relatively vertically reciprocate while continuously moving in synchronization in said feeding direction during a cutting operation.

2. The apparatus of claim 1 wherein said means for permitting said base to move only in said feeding direction comprise a stationary bed, roller means connected between said bed and said base, and means for guiding said roller means for movement only in said feeding direction.

3. The apparatus of claim 1 wherein said means for moving said base in said feeding direction in synchronization with said turning arm comprises:
   vertical slide guides mounted on said turning arm; and
   U-shaped guide members attached to said base and slidably mounted on said slide guides.

4. The apparatus of claim 2 wherein said means for moving said base in said feeding direction in synchronization with said turning arm comprises:
   vertical slide guides mounted on said turning arm; and
   U-shaped guide members attached to said base and slidably mounted on said slide guides.

5. The apparatus of claim 1 wherein said means for rotating said turning table comprise:
   an internal gear mounted on said turning table;
   a meshing gear meshing with said internal gear;
   a motor; and
   means including a universal joint for connecting said meshing gear with an output shaft of said motor.

6. The apparatus of claim 4 wherein said means for rotating said turning table comprise:
   an internal gear mounted on said turning table;
   a meshing gear meshing with said internal gear;
   a motor; and
   means including a universal joint for connecting said meshing gear with an output shaft of said motor.

7. The apparatus of claim 1 wherein said means for causing said upper cutter holder to rotate with said lower cutter holder comprise:
   slide guides mounted on said turning arm and slidably supporting said upper cutter holder;
   bosses formed on said lower cutter holder; and
   vertically extending guide posts fixed to said upper cutter holder and slidably extending through said lower cutter holder.

8. The apparatus of claim 6 wherein said means for causing said upper cutter holder to rotate with said lower cutter holder comprise:
   slide guides mounted on said turning arm and slidably supporting said upper cutter holder;
   bosses formed on said lower cutter holder; and
   vertically extending guide posts fixed to said upper cutter holder and slidably extending through said lower cutter holder.

9. The apparatus of claim 1 comprising two of said lines of crank shafts.

10. The apparatus of claim 8 comprising two of said lines of crank shafts.

* * * * *